US006966425B2

(12) United States Patent
Leisner et al.

(10) Patent No.: US 6,966,425 B2
(45) Date of Patent: Nov. 22, 2005

(54) APPARATUS FOR ZONE MONITORING

(75) Inventors: Ernst Leisner, Ludwigsburg (DE); Elmar Ziegler, Renningen (DE)

(73) Assignee: Bosch Rexroth AG, Stuttgart (DE)

( * ) Notice: Subject to any disclaimer, the term of this patent is extended or adjusted under 35 U.S.C. 154(b) by 80 days.

(21) Appl. No.: 10/788,531

(22) Filed: Mar. 1, 2004

(65) Prior Publication Data

US 2005/0029083 A1 Feb. 10, 2005

(30) Foreign Application Priority Data

Aug. 7, 2003 (DE) .......................... 203 12 217 U

(51) Int. Cl.[7] .............................................. B65G 43/08

(52) U.S. Cl. .................. 198/464.2; 198/572; 198/353; 198/355

(58) Field of Search ................................ 198/351, 353, 198/355, 464.2, 572, 341.07, 358, 368, 460.1

(56) References Cited

U.S. PATENT DOCUMENTS

| | | | | |
|---|---|---|---|---|
| 4,062,439 A | * | 12/1977 | Kato et al. | 198/464.2 |
| 4,114,773 A | * | 9/1978 | Sekiguchi | 198/572 |
| 4,147,013 A | * | 4/1979 | Seragnoli | 198/464.2 |
| 4,842,125 A | * | 6/1989 | Besemann | 198/457.03 |

FOREIGN PATENT DOCUMENTS

| | | | |
|---|---|---|---|
| DE | 922 517 | | 1/1955 |
| DE | 34 03 430 A1 | | 8/1985 |
| DE | 36 29 489 A1 | | 3/1988 |
| DE | 44 30 046 | | 2/1996 |
| DE | 44 30 046 C2 | | 8/2001 |
| FR | 1 355 354 | | 2/1964 |
| FR | 2690907 | * | 11/1993 |
| JP | 2001126582 | | 5/2001 |

OTHER PUBLICATIONS

Patent Abstracts of Japan 58144014 A, Aug. 27, 2003.
Patent Abstracts of Japan 2001126582 A, May 11, 2001.

* cited by examiner

*Primary Examiner*—James R. Bidwell
(74) *Attorney, Agent, or Firm*—Michael J. Striker

(57) ABSTRACT

An apparatus for detecting the presence of a workpiece carrier in a predetermined track portion of a workpiece carrier transporting path has a housing, a slider which is displaceably guided in the housing and is displaced by the workpiece carrier, at least one proximity switch which is releasable by the slider, two turning elements provided with teeth and arranged on the housing, each of the turning elements being supported turnably around an axis provided on the housing, the turning elements being in tooth engagement with one another, the turning elements being also in tooth engagement with linear tooth sets provided on opposite sides of the slider and extending in a linear displacement direction.

15 Claims, 3 Drawing Sheets

APPARATUS FOR ZONE MONITORING

BACKGROUND OF THE INVENTION

The present invention relates to an apparatus for detecting the availability of a workpiece carrier in a predetermined track portion of a workpiece carrier transportation path, which includes a housing, a slider which is displaceably guided in the housing and displaced directly or indirectly by the workpiece carrier, and at least one proximity switch releasable by the slider.

Such apparatuses are known in the prior art and identified as "rockers". They can be arranged for example laterally on the workpiece carrier transporting path for detecting the transitional movement of a workpiece carrier (FIG. 1). The workpiece carrier is brought in engagement with the slider of the rocker and deviates it in a direction which is substantially orthogonal to the movement direction of the workpiece carrier. The displacement movement of the slider can be detected by a proximity switch. The output signal of the proximity switch can be used to control further steps, for example a processing step to be started on a workpiece arranged on the workpiece carrier.

It is however also possible to allow running of the workpiece carrier head-on against the rocker so that the slider is displaced by the workpiece carrier substantially in its movement direction (FIG. 2). In this case the output signal of the proximity switch can set in operation for example a pushing device or a transferring device which transfers the workpiece carrier from the current transporting path to the next following transporting path.

Conventionally, the slider in the known rockers is displaceably guided in the housing by means of cooperating wall surfaces of the slider and the housing.

The disadvantage of the known constructions of such rockers include first of all the fact that during engagement of the workpiece carrier and the slider a tilting of the slider, and if worse come to worse, a turning and clamping of the slider in the housing can occur. The switching conditions of the proximity switch released by the slider can not be reproduced in this case with the required accuracy, in particular a switching delay can occur.

SUMMARY OF THE INVENTION

Accordingly, it is an object of the present invention to provide an apparatus for zone monitoring, which avoids the disadvantages of the prior art.

More particularly, it is an object of the present invention to provide an apparatus for zone monitoring, in which switching conditions can be reproducible with a desired precision.

In keeping with these objects and with others which will become apparent hereinafter, one feature of the present invention resides, briefly stated in an apparatus for zone monitoring, in which in the housing two turning elements are provided which have teeth and are formed so that each of the turning elements is turnable about an axis which is supported or arranged on the housing, and the both turning elements on the one hand are in engagement by their teeth with one another and on the other hand are in tooth engagement with linear teeth provided on opposite sides of the slider and extending substantially in a linear displacement direction.

By the cooperation of the linear teeth arranged on the slider and the turning elements supported on the housing, it is guaranteed that the linear teeth and thereby the opposite sides of the slider, on which the linear teeth are provided, are displaced with the same speed in the housing. Thereby a tilting or turning of the slider in the housing can no longer occur. The same is true with respect to a displacement of the slider out of the housing, which is caused for example by a restoring spring.

It should be mentioned that the use of toothed elements as such is known, but not in the technical field relating to the present invention. For example German patent document DE 44 30 046 C2 discloses a safety load switching device with a plurality of safety units, in which for performing the switching movement each of the safety inserts is provided with a toothed wheel-toothed rack drive. This transverses a turning movement of a hand operating lever into a linear movement of the safety inserts. Japanese patent document JP-2001-1265828 discloses a key for a keyboard, on which the axis of two turnable and toothed-engageable sector discs are supported. The free ends of two elongated projections of these sector discs are guided linearly displaceably on a base plate of the keyboard.

In the inventive apparatus a space-saving arrangement of the toothed elements engaged with one another is obtained, in that at least one turning element is formed as a turning lever which is provided on its both free ends correspondingly with a set of teeth.

The linear teeth can be formed basically on specifically designed toothed rods which are mounted on the slider. Preferably the linear teeth can be worked in a wall of the slider which extends in the housing. In both cases the linear teeth run for example substantially in the linear displacement direction of the slider.

In accordance with a further embodiment of the invention, it is proposed that the proximity switch is an inductive proximity switch or a pneumatic proximity switch. The housing in this case can be provided both with a receptacle for an inductive proximity switch and with a receptacle for a pneumatic proximity switch. When the inductive proximity switch is provided, the slider can be provided with a preferably metallic actuating element, for example a metal plate for releasing the proximity switch.

For facilitating the linear displacement of the slider by the workpiece carrier, in particular in the case of the lateral arrangement of the inventive apparatus on the workpiece carrier transporting path, in accordance with a further embodiment of the invention it is proposed that a slider or an element mounted on the slider has at least one facial running incline, which can be inclined relative to the linear displacement direction, for example by an angle of between 45° and 90°, preferably substantially 65°. For the case of the frontal action of the workpiece on the slider, the slider or the element mounted on it moreover can be provided with an abutment surface which is arranged substantially orthogonal to the linear displacement direction.

As mentioned above, a restoring spring can be further provided, which pre-stresses the slider to an actuation-ready position, or in other words to a position in which it is ready to perform a linear displacement movement under the action of a workpiece carrier, with which the at least one proximity switch is released.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
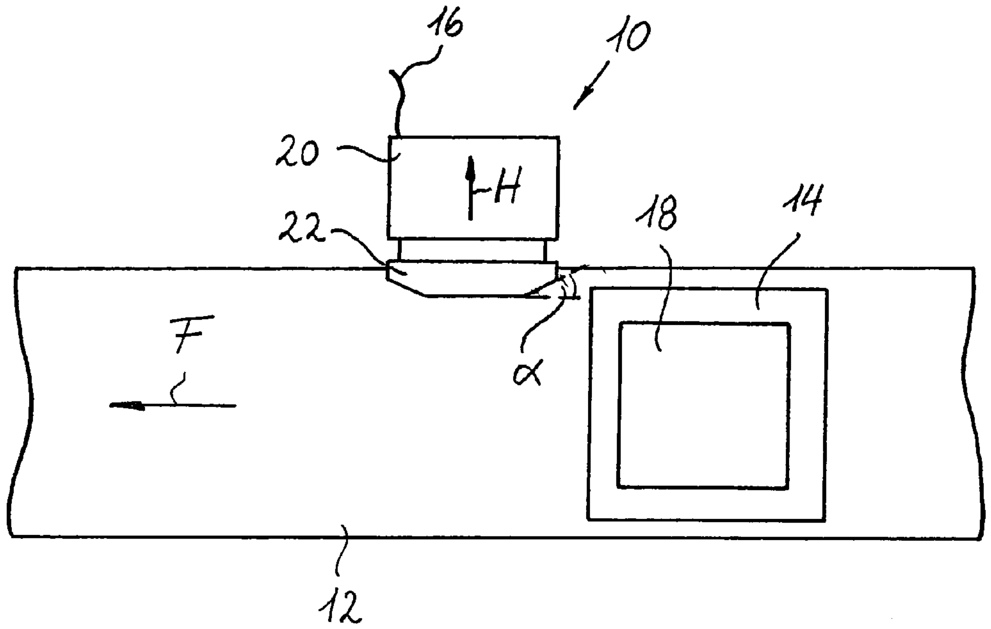
FIGS. 1 and 2 are schematical plan views of two workpiece carrier transporting paths provided with an inventive apparatus.

An apparatus for zone monitoring in accordance with the present invention is identified in general with reference numeral 10. It is arranged laterally on a workpiece transporting path 12 which transports a workpiece carrier 14 in direction of the arrow F. The apparatus 10 serves for detecting the transitional movement of the workpiece carrier 14 and transmitting a corresponding detection signal through a signal conductor 16 to a not shown control unit, which in turn controls a not shown apparatus for treatment of a workpiece 18 arranged on the workpiece carrier 14. In the case shown in FIG. 1, the workpiece carrier 14 deviates a slider 22 which is displaceably received in a housing 20 of the apparatus, into a stroke direction H which extends substantially orthogonally to the transporting direction.

Figure 2:
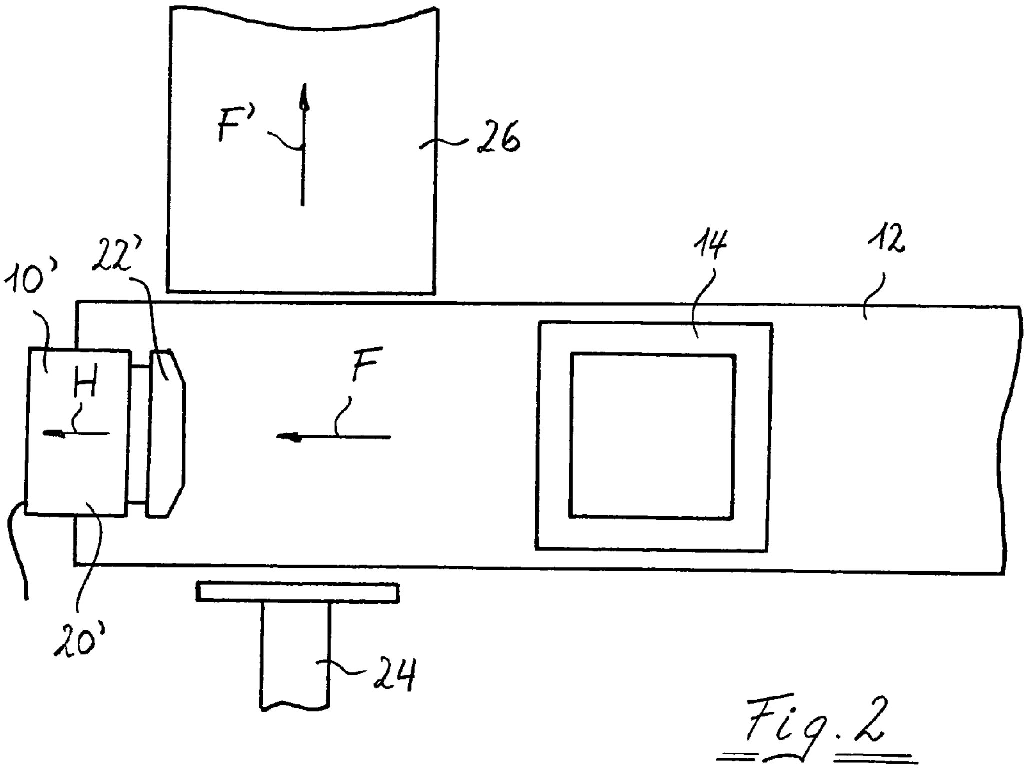

As can be seen from FIG. 2, it is however basically also possible to run the workpiece carrier 14 which is transported by the transporting path 12, in direction of the arrow F head-on against an inventive arrangement 10'. In other words the stroke direction H of the slider 22' in the housing 20 extends substantially parallel to the transporting direction F. The signal provided from the apparatus 10' can be used in this case for example for controlling a transfer device 24, which transfers the workpiece carrier 14 from the transporting path 12 to a subsequently arranged transporting path 26, which then transports the workpiece carrier 14 in direction F'.

Such apparatuses 10 and 10' are known by experts as rockers.

Figure 3:
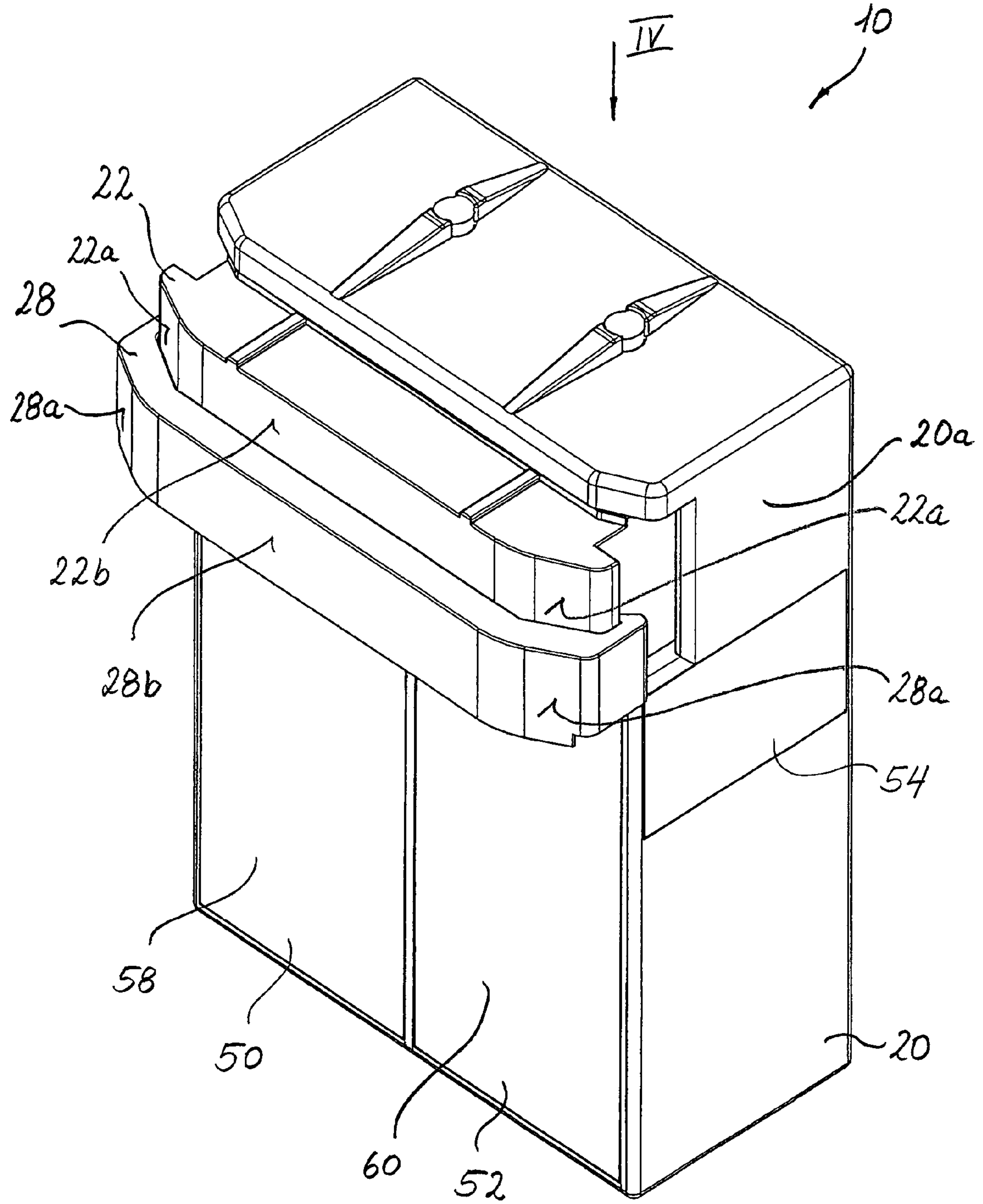
FIG. 3 is a perspective view of the apparatus in accordance with the present invention.

FIG. 3 shows the inventive apparatus or rocker 10 in perspective. It includes, as explained herein above, the housing 20 and the slider 22 which is displaceably received in the housing 20. In the shown embodiment a projection 28 is further provided on the slider 22. This projection 28 can serve on the one hand as a wear-protection element for the slider 22. It can also be used, with a corresponding dimensioning of its thickness, as a spacer adapting piece between the arrangement point of the rocker 10 on the transporting path 12 and the workpiece carrier 14.

Inclined surfaces 22*a* and 28*a* are formed on the slider 22 and on the projection 28. They serve as running inclines for the workpiece carrier 14 and thereby facilitate a displacement movement of the slider 22 into the housing 20. These inclined surfaces include an angle $\alpha$ with the transporting direction F of the workpiece carrier transporting path 12. The angle $\alpha$ can be within the range from 0° to substantially 45° and preferably is equal to substantially 25° as shown in FIG. 1. The angle $90°—\alpha$ enclosed between the inclined surfaces 22*a* and 28*a* and the linear displacement direction H correspondingly has a value of between substantially 45° and substantially 90° and preferably substantially 65°. An abutment surface 22*b* or 28*b* is provided between both inclined surfaces 22*a* and 28*e* on the slider 22 and on the projection 28. The workpiece carrier 14 runs against these abutment surfaces in the arrangement shown in FIG. 2.

Figure 4:
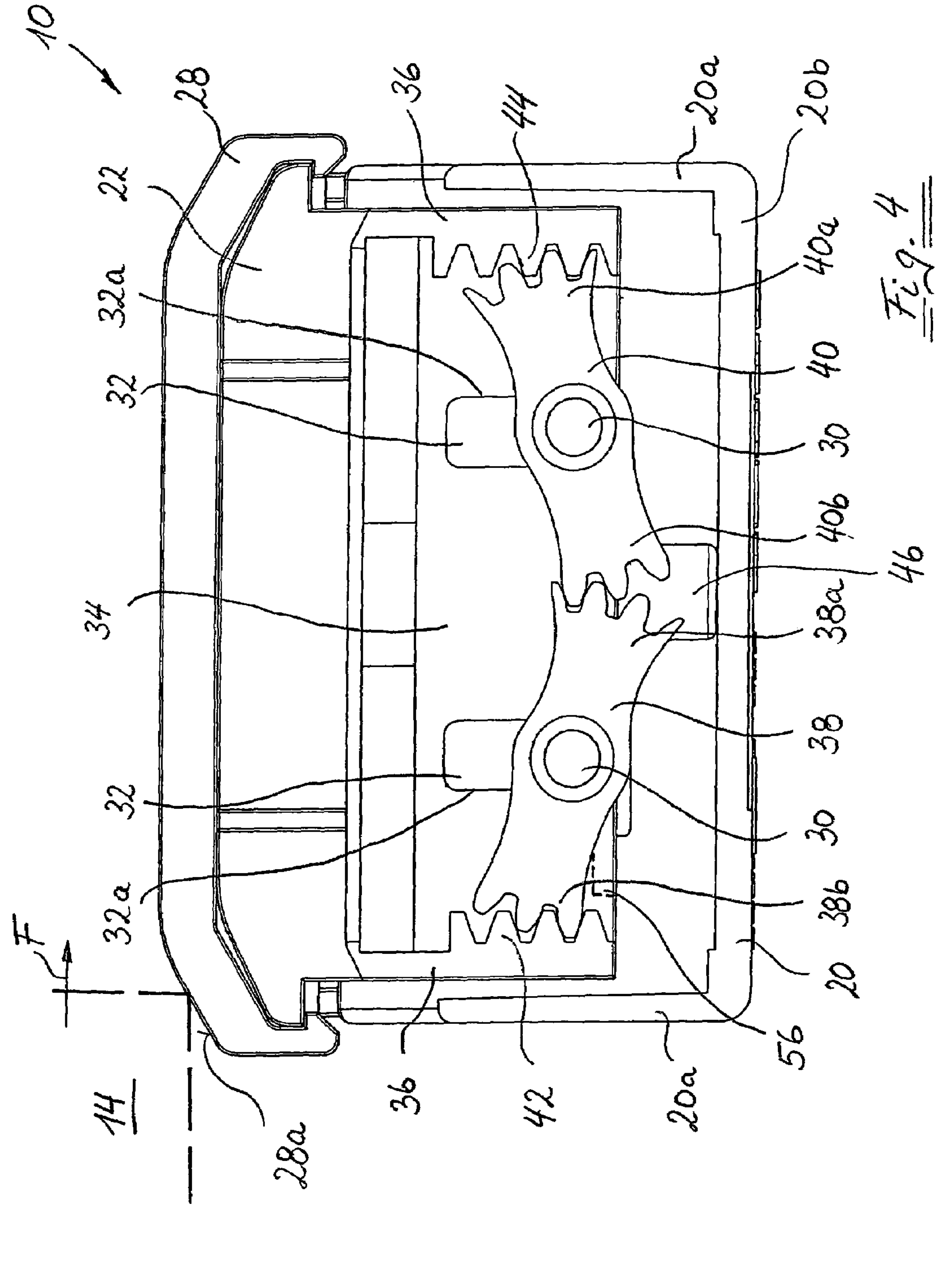
FIG. 4 is a partially sectioned plan view in direction of arrow IV in FIG. 3 for illustration of the guidance of the slider in the housing.

FIG. 4 shows a mechanical system, which guarantees that the slider 22 during displacement into the housing 20, as well as during displacement out of the housing 20, is not tilted in the housing 20, but instead also with a lateral abutment of the workpiece carrier 14, or in other words in the arrangement shown in FIG. 1, moves in the housing 20 in a tilting-free manner.

A basic guidance of the slider 22 on the housing 20 is performed by two pins 30 which are arranged or supported on the housing 20 and extend through longitudinal holes 32 formed in two walls 34 arranged opposite to one another and extending in the housing 20. Only one of the walls, out of the two walls 34 of the slider 22, is shown in FIG. 4 due to the cross-sectional view. The pins 30 slide along outer limiting edges 32*a* of the longitudinal holes 32.

Two walls 36 which connect the walls 34 on the slider 22 with one another and extend substantially orthogonal to the walls 34, are arranged at a distance from the side walls 20*a* of the housing 20.

The above mentioned pins 30 serve as bearing axles or bearing shafts for two turning levers 38 and 40, which are provided on their free ends with sets of teeth 38*a*, 38*b*, 40*a*, 40*b*. Moreover, linear sets of teeth 42 and 44 are provided on the inner side of the walls 36 of the slider 22. These linear tooth sets can be formed for example on tooth rods, which are mounted on the inner side of the wall 36 or are formed directly on or in the inner side of the walls 36.

As shown in FIG. 4, the linear tooth set 42 is in tooth engagement with the tooth set 38*b* of the turning lever 38. Furthermore, the tooth set 38*a* of the turning lever 38 is in tooth engagement with the tooth set 40*b* of the turning lever 40. The tooth set 40*a* of the turning lever 40 is finally in tooth engagement with the linear tooth set 44.

When a workpiece carrier 14 shown in FIG. 4 in a broken line runs in the transporting direction F against the left side of the slider 22 or the projection 28 in FIG. 4, or more accurately against its inclined surface 28*a*, then the left side of the slider 22 is displaced into the housing 20. Due to the different tooth set engagements 42/38*b*, 38*a*/40*b* and 40*a*/44 this insertion movement of the left side of the slider 22 is transmitted also to its right side, so that both sides of the slider 22 move with the same speed into the housing 20. In this case a tilting of the slider 22 in the housing 20 can be avoided, which in conventional rockers based on the one-side engagement workpiece of the carrier 14 leads to a the risk of a switching delay.

It should be added that between the rear wall 20*b* of the housing 20 and the slider 22, a restoring spring 46 is arranged. It moves the slider 22 after the transition movement of the workpiece carrier 14 again out of the housing 20. This movement is limited by abutment of the pins 30 against end sides of the longitudinal holes 32 which are covered in FIG. 4 by the turning levers 38 and 40.

It should be further mentioned with respect to FIG. 3 that in the housing 20 of the inventive rocker 10, receptacles 50 and 52 are provided for two proximity switches. For example, in the receptacle 50 an inductive proximity switch 58 can be arranged, and the receptacle 52 a pneumatic proximity switch 60 can be arranged. The connecting points 54 for one of these proximity switches are schematically shown in FIG. 3. As for the provision of the inductive proximity switch 58, a metal plate 56 is moreover arranged on the slider 20 as shown in FIG. 4.

It will be understood that each of the elements described above, or two or more together, may also find a useful application in other types of constructions differing from the types described above.

While the invention has been illustrated and described as embodied in, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention. What is claimed as new and desired to be protected by Letters Patent is set forth in the appended claims:

What is claimed is:

1. An apparatus for detecting the presence of a workpiece carrier in a predetermined track portion of a workpiece carrier transporting path, comprising a housing; a slider which is displaceably guided in said housing and is displaced by the workpiece carrier; at least one proximity switch which is releasable by said slider; two turning elements provided with teeth and arranged in said housing, each of said turning elements being supported turnably around an axis provided on said housing, said turning elements being in tooth engagement with one another, said turning elements being also in tooth engagement with linear tooth sets provided on opposite sides of the slider and extending in a linear displacement direction.

2. An apparatus as defined in claim 1, wherein at least one of said turning elements is formed as a turning lever which has two free ends each provided with a tooth set.

3. An apparatus as defined in claim 1, wherein said linear tooth set is formed in a wall of said slider, which extends in said housing.

4. An apparatus as defined in claim 1, wherein said proximity switch is a switch selected from the group consisting of an inductive proximity switch and pneumatic proximity switch.

5. An apparatus as defined in claim 4, wherein said housing is provided with a receptacle for said inductive proximity switch and also with a receptacle for said pneumatic proximity switch.

6. An apparatus as defined in claim 4, wherein said slider is provided with an actuating element for releasing said proximity switch.

7. An apparatus as defined in claim 6, wherein said actuating element is formed as a metallic actuating element.

8. An apparatus as defined in claim 7, wherein said actuating metallic element is formed as a metal plate.

9. An apparatus as defined in claim 1, wherein said slider has at least one lateral abutment incline which is inclined relative to said linear displacement direction at an angle substantially between 45° and 90°.

10. An apparatus as defined in claim 9, wherein said lateral abutment incline is inclined relative to said linear displacement direction at an angle of 25°.

11. An apparatus as defined in claim 1; and further comprising an element which is mounted on said slider and has at least one lateral abutment incline which is inclined relative to said linear displacement direction at an angle substantially between 45° and 90°.

12. An apparatus as defined in claim 11, wherein said lateral abutment incline is inclined relative to said linear displacement direction at an angle of 25°.

13. An apparatus as defined in claim 1, wherein said slider has an abutment surface which is arranged substantially orthogonal to said linear displacement direction.

14. An apparatus as defined in claim 1; and further comprising an element which is mounted on said slider and has an abutment surface arranged substantially orthogonal to said linear displacement direction.

15. An apparatus as defined in claim 1; and further comprising a restoring spring which pre-stresses said slider to an actuation ready position.

* * * * *